United States Patent [19]
Minnich

[11] Patent Number: 4,473,876
[45] Date of Patent: Sep. 25, 1984

[54] ELECTROHYDRAULIC SERVOVALVE SAFETY APPARATUS

[75] Inventor: George E. Minnich, Vestal, N.Y.

[73] Assignee: The Singer Company, Binghamton, N.Y.

[21] Appl. No.: 328,060

[22] Filed: Dec. 7, 1981

[51] Int. Cl.³ .................... G05B 9/02; G05B 23/02
[52] U.S. Cl. .................... 364/184; 91/363 A; 235/200 R; 318/563; 364/141; 364/180; 364/187
[58] Field of Search ................ 364/184–187, 364/140, 141, 160, 180; 318/563, 564, 565, 590, 591, 615, 632; 91/1, 360, 361, 363 R, 363 A, 459; 137/624.18, 625.66, 559, 557, 551, 552; 235/200 R, 200 PF, 201 R, 201 ME, 200 FS

[56] References Cited

U.S. PATENT DOCUMENTS

| | | | |
|---|---|---|---|
| 3,414,884 | 12/1968 | Jensen | 364/141 X |
| 3,489,889 | 1/1970 | Escobosa | 235/200 R X |
| 3,724,330 | 4/1973 | Mason | 91/363 A |
| 3,744,029 | 7/1973 | Nyman | 137/624.18 X |
| 4,294,162 | 10/1981 | Fowler et al. | 91/363 A X |
| 4,345,191 | 8/1982 | Takats et al. | 91/363 A X |

*Primary Examiner*—Joseph F. Ruggiero
*Attorney, Agent, or Firm*—Douglas M. Clarkson; Stephen C. Kaufman

[57] ABSTRACT

Safety apparatus for an electrohydraulic servovalve. The safety apparatus includes a digital programmable switch (14) which is programmed to make switching decisions on the basis of whether or not the electrohydraulic servovalve is subjected to an external error and whether or not the electrohydraulic servovalve is free from internal error. Logic inputs that supply this information are provided to the programmable switch (14) by a logic device (16). On the basis of the logic inputs, the programmable switch (14) is programmed to interconnect, in a sequential manner, the analog electrohydraulic servovalve to one of four different analog drive systems. One of the drive systems is employed for the case whether there is no external or internal error, so that the electrohydraulic servovalve is in a normal mode of operation. Two of the drive systems are employed to quickly and safely de-energize the electrohydraulic servovalve upon the occurrence of an external error. The fourth drive system is employed to controllably re-energize the electrohydraulic servovalve back to its normal mode of operation, upon the removal of the external error.

2 Claims, 4 Drawing Figures

4,473,876

ELECTROHYDRAULIC SERVOVALVE SAFETY APPARATUS

TECHNICAL FIELD

The present invention relates to electrohydraulic servovalves and more particularly relates to a safety apparatus for a drive system associated with an electrohydraulic servovalve.

BACKGROUND ART

The operation of an electrohydraulic servovalve (hereinafter servovalve) of the type for which the present invention is particularly important is set forth in detail in U.S. patent application Ser. No. 328,058 entitled Electronic Compensator For An Electrohydraulic Servovalve, by Applegate et al., filed on Dec. 7, 1981, and assigned to the same assignee as the present invention. This Applegate disclosure is incorporated by reference herein for a thorough exposition of the operation of a servovalve.

In brief, the operation of a servovalve includes the employment of a drive system which functions to supply a constant drive signal to the armature of a torque motor of the servovalve. In response to the drive signal, the motor develops a force or torque which is transmitted from the armature to a drive arm. Movement of the drive arm results in an input motion to an hydraulic spool valve. The input motion to the hydraulic spool valve, in turn, regulates a flow of hydraulic fluid, for example oil, to either side of a main cylinder. The resulting difference in pressure on a piston enclosed in the cylinder causes motion of an output shaft.

The energy developed by the motion of the output shaft, for relatively large servovalves (e.g. greater that 3 GPM rated flow), is approximately 5 to 10 joules. This is a significant amount of energy. It is advantageous, therefore, that servovalves be provided with safety features so that in the event of an electrical, hydraulic or mechanical error in the equipment that externally services the servovalve, the servovalve can be quickly and safely de-energized. In this way, it is possible to provide a safe environment for the operator of a servovalve and prevent damage to any auxiliary equipment connected to the output shaft.

One attempt to provide a servovalve with safety features includes the use of an abort valve. The abort valve becomes active when an external error is detected, and functions to remove the hydraulic fluid supply pressure. This action, in turn, eliminates the pressure on the piston so that the motion of the output shaft ceases.

Abort valves have been satisfactorily employed with servovalves which have narrow bandwidths, typically less that 10 hz. For these servovalves, the rise time, as conventionally defined, is approximately 35 milliseconds. Consequently, in order to be effective, the abort valve needs to have a reaction time of less than 35 milliseconds. Since commercially available abort valves have reaction times on the order of 20 milliseconds, they are suitably employed with narrow bandwidth servovalves.

A state-of-the-art servovalve, on the other hand, extends the bandwidth to at least 100 hz. Accordingly, the reaction time of the servovalve is reduced to less that 3.5 milliseconds. It follows, therefore, that the reaction time of the abort valve should also be on the order of 3.5 milliseconds.

As indicated above, however, abort valves which have reaction times appreciably greater than 20 milliseconds are not commercially available. Hence, there is a need for a safety apparatus that can be employed with a state-of-the-art servovalve. The present invention fulfills this need by providing a safety apparatus associated with the drive system of a servovalve. The safety apparatus of the present invention is successfully employed with an extended bandwidth servovalve, since the reaction time of this safety apparatus is less than 50 nanoseconds.

The present invention is particularly suitable for employment with a relatively large, two-stage servovalve. The safety apparatus ensures that, upon the occurrence of an external error, the servovalve is quickly and safely de-energized. Moreover, upon the correction of the external error, the present invention safely restores the normal operation of the servovalve.

DISCLOSURE OF THE INVENTION

Accordingly, it is an object of the present invention to provide a safety apparatus that enables a servovalve to be employed in state-of-the-art applications.

Another object of the present invention is to provide such a safety apparatus that can quickly and safely de-energize the normal operation of a servovalve upon the ocurrence of an external error, and re-energize the servovalve back to its normal mode of operation upon the removal of the external error.

In accordance with the present invention, an electrohydraulic servovalve is provided with a safety apparatus that includes a programmable switch means programmed for switching sequentially amongst a plurality of channels. The program is based on whether or not the servovalve is subjected to an external error and whether or not the servovalve is free from internal error. Further provided is a plurality of channel means, each of which receives an input control signal and develops a drive signal to drive the servovalve. The safety apparatus also includes means to determine whether or not the servovalve is free from internal error, for input to the programmable switch means, by comparing an output signal of the servovalve with the input control signal.

BRIEF DESCRIPTION OF THE DRAWINGS

These and other features of the present invention will be more clearly understood from a consideration of the following description taken in connection with the accompanying drawings in which.

BEST MODE FOR CARRYING OUT THE INVENTION

Figure 1:
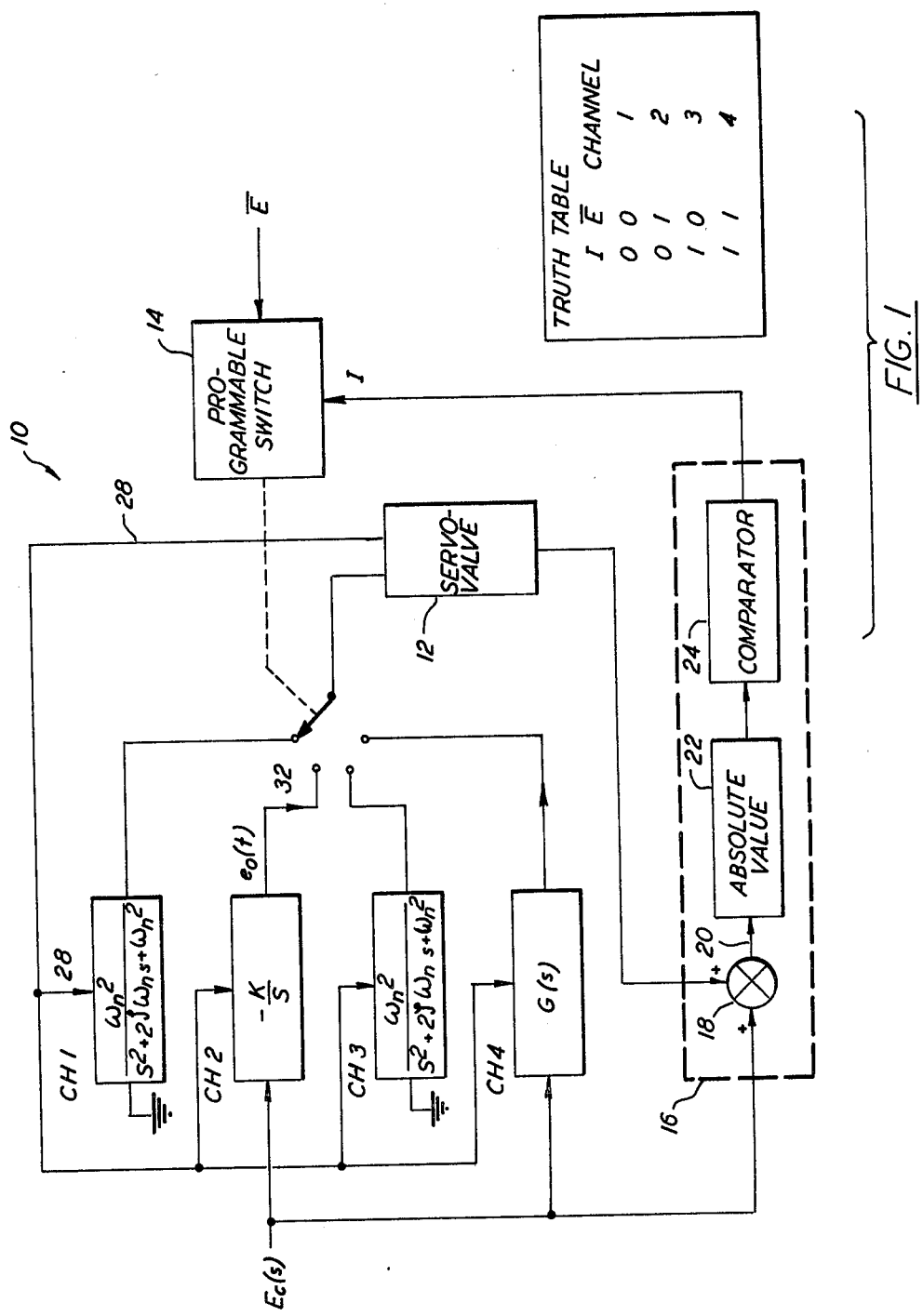
FIG. 1 is a block diagram of the safety apparatus of the present invention.

The safety apparatus 10 of the present invention shown in FIG. 1 quickly and safely de-energizes a normal mode of operation of a servovalve 12 upon the occurence of an external error. For purposes of the present invention, an external error is defined to be an electrical, hydraulic or mechanical error or failure that is located external to the servovalve itself. Thus, for example, an external error includes a failure of a hydraulic pump or a transient in the electrical power lines.

The present invention does not itself detect the external error. However, it does provide a conventional digital programmable switch 14 which is programed in correspondence to a truth table shown in FIG. 1 of the drawings. The programmable switch 14 accepts a first input $\bar{E}$ which carries the information as to whether or not there is an external error. In particular, the input $\bar{E}$ is defined as the complement of E, where E is the external error. In a preferred embodiment of the present invention, E is assigned a logic value of 1 and $\bar{E}$ is assigned a logic value of 0 when there is external error. Conversely, $\bar{E}$ is assigned a logic value of 1 when there is no external error.

The safety apparatus of the present invention, moreover, quickly and safely re-energizes the servovalve back to its normal mode of operation upon the removal of the external error. The normal mode of operation corresponds to a characterization of the servovalve as being substantially free from *internal* error so that the servovalve is in an "ideal" logic state. The programmable switch 14 accepts a second input I which carries information as to whether or not the servovalve is in an ideal state. In particular, the second input I is assigned a logic value of I=1 when the servovalve is in an ideal state and there is no internal error, and is assigned a value of I=0 when the servovalve is not in an ideal state and there is an internal error.

In summary, therefore, it is observed from FIG. 1 that the programmable switch 14 accepts four different permutations of the first and second inputs $\bar{E}$ and I. On the basis of the four different permutations, the programmable switch 14 functions as a switch to sequentially connect the servovalve 12 to one of a plurality of channels identified respectively in FIG. 1 as channels one, two, three and four. Each of the four channels functions as a drive system since it receives an input control signal and develops an output drive signal which drives the servovalve 12.

As just stated, each of the four channels are similar in that they each receive an input control signal and develop an output drive signal. However, the four channels are realized by electrical circuit configurations which are different. Thus, each channel functions to receive and develop a particular input control signal and output drive signal. As will become clearer from the forthcoming description, the safety features of the present invention are realized by programming the programmable switch 14 to sequentially switch amongst the four channels on the basis of the four permutations of $\bar{E}$ and I shown in FIG. 1.

Figure 2:
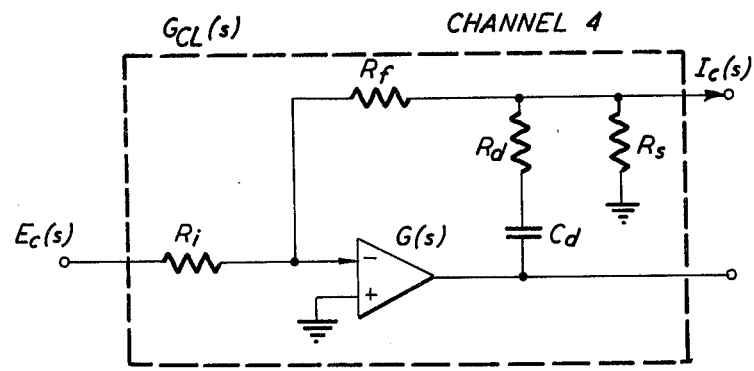
FIG. 2 is a circuit diagram of the drive system of channel 4 of the present invention that may be employed when a servovalve is in a normal mode of operation.

Assume, for example, that there is no external or internal error, so that $\bar{E}=1$ and I=1. According to FIG. 1, the programmable switch 14 is programmed to switch to channel 4. Since, for this example, there is no external or internal error, channel 4 is appropriately realized by a drive system that is employed for a normal mode of operation of a servovalve. Such a drive system is shown in FIG. 2. A drive system of this type is set forth, in detail in U.S. patent application Ser. No. 328,059 entitled Compensation Apparatus For An Electrohydraulic Servovalve, by Minnich, filed on Dec. 7, 1981 U.S. Pat. No. 4,439,716, and assigned to the same assignee as the present invention. This Minnich disclosure is incorporated by reference herein for a thorough exposition of the operation of a drive system for a normal mode of operation of a servovalve.

In brief, the drive system of channel 4, as realized by the electrical circuit of FIG. 2, accepts an input control signal $E_c(s)$ and provides an output signal $I_c(s)$. These signals are related by the following equation (1):

$$E_c(s) = G^{-1}(s)I_c(s) \tag{1}$$

where G(s) is a transfer function that relates the input control signal $E_c(s)$ with the output signal $I_c(s)$. The output signal $I_c(s)$ provides, in turn, a drive signal which is inputted to the serVovalve 12.

The drive system of channel 4 is advantageously employed when the servovalve is in a normal mode of operation. As stated above, a normal mode of operation corresponds to a characterization of the servovalve as being substantially free from internal error. In particular, a servovalve is substantially free from internal error when equation (1) is satisfied, that is when $$E_c(s) - G^{-1}(s)I_c(s) = 0 \tag{2}$$

As also indicated above, the programmable switch 14 is assigned a logic value of I=1 when the servovalve is free from internal error, and conversely, is assigned a logic value of I=0 when the servovalve is not free from internal error.

A logic device 16 is associated with the drive system of channel 4 (as well as with the drive systems of channels 1 through 3) and functions in a twofold manner to determine, firstly, whether or not there is internal error (in accordance with equation 2), and secondly, to assign the proper logic value of I, based on this determination. As shown in FIG. 1, the logic device 16 includes a conventional adder 18 which accepts a first input $E_c(s)$ and a second input $I_c(s)$. The adder 18 functions to add $E_c(s)$ with a voltage representation of the second input $I_c(s)$, (i.e. $kI_c(s)$ where k is constant) to form an output signal 20 for further input to a conventional absolute value device 22. The absolute value device 22 functions to take the absolute value of the input signal 20.

In a preferred embodiment of the present invention, the absolute value of the signal 20 is not compared with an ideal internal error value of zero (as implied by equation (2)). Rather, a conventional comparator device 24 is employed to compare the magnitude of the signal 20 against a preselected internal error magnitude. In effect, the comparator device 24 evaluates the following equation:

$$|E_c(s) - kI_c(s)| < \text{internal error magnitude} \tag{3}$$

On the basis of the determination of the value of $|E_c(s) - kI_c(s)|$, as compared to the preselected internal error magnitude, the comparator device 24 further functions to output to the programmable switch 14 a logic value of I=1, when the servovalve is free from internal error, or a logic value of I=0, when the servovalve is not free from internal error. When the servovalve is in a normal mode of operation, for example, the absolute value of the difference between $E_c(s)$ and $kI_c(s)$ is less than the preselected internal error magnitude, so the comparator device 24 outputs a logic value of I=1 to the programmable switch 14.

The servovalve operates in a normal mode of operation, and thus continues to employ a drive system of the type provided by channel 4, until the programmable switch 14 accepts a new first input $\overline{E}=0$. The input $\overline{E}=0$ signifies that there exists external error. The existence of external error thus correspond initially to first and second inputs to the programmable switch 14 of $\overline{E}=0$ and I=1, respectively. FIG. 1 indicates that these inputs correspond to channel 3, and, accordingly, the programmable switch 14 functions to switch the servovalve to the drive system provided by channel 3.

Figure 3:
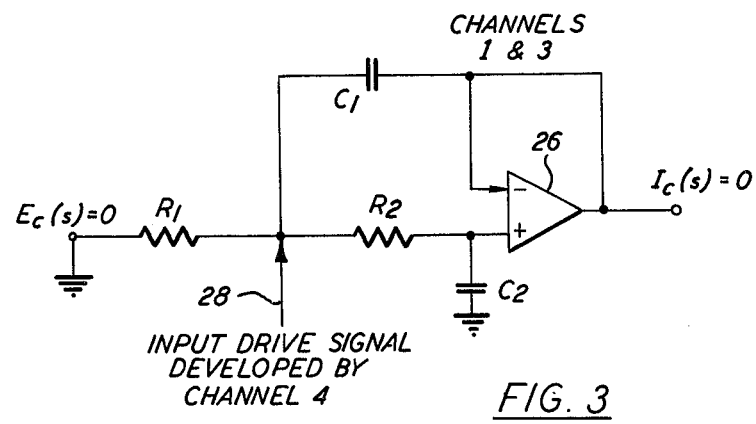
FIG. 3 is a circuit diagram of the drive system of channels 3 and 1 of the present invention, that may be employed to quickly and safely de-energize the normal mode of operation of the servovalve.

The drive system provided by channel 3 is realized by an electrical circuit configuration shown in FIG. 3. In this circuit, the input control signal $E_c(s)$ is inputted to a resistor $R_1$ which is connected to ground. Consequently, $E_c(s)$ is equal to zero and the output signal $I_c(s)$ is also equal to zero. As indicated above, the output signal $I_c(s)=0$ provides, in turn, an input drive signal to the servovalve. Since this input drive signal $I_c(s)$ has zero magnitude, the servovalve is brought to a quick and controlled stop.

The drive system provided by channel 3 includes, moreover, safety apparatus to safely as well as quickly, de-energize the servovalve. De-energization specifically concerns the problem of safely collapsing a magnetic field which is developed in the armature of the torque motor by the drive signal outputted by channel 4 during a normal mode of operation. It takes a finite amount of time, typically milliseconds, to safely collapse the developed magnetic field.

Accordingly, the safety apparatus of the drive system of channel 3 further includes a capacitive circuit wherein a capacitor $C_1$ is connected between a conventional operational amplifier 26 and the input resistor $R_1$. The capacitor $C_1$ is provided with a current input 28. This current input 28 is, in fact, the drive signal $I_c(s)$ which is provided by the drive system of channel 4 during a normal mode of operation of the servovalve. The capacitor $C_1$ in effect, "tracks" the drive signal $I_c(s)$ during a normal mode of operation.

As the capacitor $C_1$ tracks the drive signal $I_c(s)$, it develops a charge Q which in turn, develops an electric field E across the plates of the capacitor $C_1$. The electric field E is related to the magnetic field developed in the armature of the torque motor, since both fields are developed by the drive signal $I_c(s)$.

The armature magnetic field, therefore, which is developed by the drive system of channel 4, is "balanced" by an electric field developed across the plates of the capacitor $C_1$ in the drive system of channel 3. When the programmable switch 14 operates and switches from channel 4 to channel 3, in the manner indicated above, the capacitor $C_1$ begins to discharge the charge Q in a controlled manner, through a conventional $R_2$-$C_2$ filter network. In this way, therefore, the armature magnetic field is controllably and safely collapsed.

In summary, therefore, the drive system of channel 3 safely de-energizes the servovalve while it quickly brings the servovalve to a stop by setting the output signal $I_c(s)$ to a zero magnitude.

If we return now to the operation of the logic device 16 which is associated with the drive system of channel 3, it is observed from equation (3) that the quantity $|E_c(s)-kI_c(s)|$ must quickly become greater than the preselected internal error magnitude, since $I_c(s)$ has a steady state magnitude of zero. When, in fact, the preselected internal error magnitude is exceeded, the comparator device 24 outputs to the programmable switch 14 a logic value of I=0. The programmable switch 14 is now supplied, therefore, with first and second inputs of $\overline{E}=0$ and I=0 respectively. According to Table 1, these inputs instruct the programmable switch 14 to switch to the drive system of channel 1.

In a preferred embodiment of the present invention, the drive system of channel 1 is identical to the drive system of channel 3. Thus, it safely deenergizes the servovalve while it quickly brings the servovalve to a stop. The channels 1 and 3, in general, are described by a second order transfer function as expressed by the following equation (4):

$$\frac{\omega_n^2}{s^2 + 2\zeta\omega_n s + \omega_n^2}$$

where
 $s=j\omega$ is a Laplacian operator
 $\omega_n$ is the undamped natural frequency and
 $\zeta$ is the damping ratio.

It may be observed, consequently, that the drive systems of channel 1 and 3 are redundant. However, in combination with the logic device 16, the two redundant channels anticipate and solve the following problem. This problem centers on the fact that the present invention is a hybrid apparatus in that it employs a digital programmable switch 14 which connects analog drive systems with an analog servovalve. It is in the nature of the digital programmable switch 14 to function as a switch within a time span of approximately 50 nanoseconds. On the other hand, it is in the nature of the analog devices to require significantly larger periods of time in order to perform various functions. For example, the time span required for the safe collapse of the magnetic field is on the order of milliseconds. It is this appreciable difference of time spans between the digital and analog devices that gives rise to the indicated problem.

The redundancy of the first and third channels provides a mechanism for addressing the problem associated with a hybrid apparatus. Thus, it is observed that the two channels provide a mechanism for switching the logic states of I so that I goes from I=1 to I=0, within the time span allotted to a digital device. And, the two channels, taken together, provide a mechanism for safely collapsing the magnetic field within the time span allotted to analog devices.

The safety apparatus of the present invention continues to employ the drive system of channel 1 until the external error is corrected. Once the external error is in fact corrected, the programmable switch 14 receives logical inputs of $\overline{E}=1$ and I=0. These inputs indicate that there is no external error, but that there is internal error. According to the truth table of table 1, the programmable switch 14 is now programmed to switch to channel 2.

Figure 4:
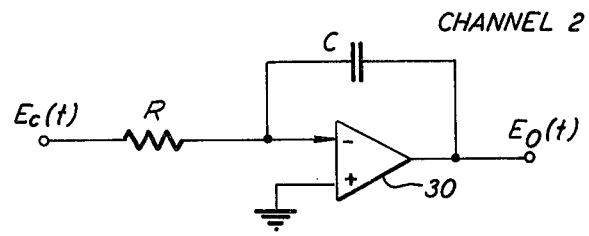
FIG. 4 is a circuit diagram of the drive system of channel 2 of the present invention that may be employed to re-energize a servovalve and restore its normal mode of operation.

Channel 2 employs a drive system which acts to quickly and safely re-energize the servovalve back to its normal mode of operation. In order to accomplish this, channel 2 provides circuitry which functions to remove the internal error. In particular, channel 2 employs a conventional integration circuit which is defined by a transfer function $-k_1/s$, where $k_1$ is a constant of integration and s is the Laplacian operator. As shown in FIG. 4, the transfer function is realized by circuitry that includes a conventional operational amplifier 30 connected to an input resistor R and a feedback capacitor C.

In operation, the drive system of channel 2 receives an input control signal $E_c(t)$ (where $E_c(t)$ corresponds to the inverse transform of the input control signal $E_c(s)$) and develops an output signal $E_0(t)$ which is related to the input control signal by the following equation (5):

$$-\frac{1}{RC} \int_0^t E_c(t)(dt) = E_o(t) \quad (5)$$

In a preferred embodiment of the present invention, the output signal $E_0(t)$ is employed as a voltage source. It is observed in FIG. 1 that $E_0(t)$ is connected in parallel with the servovalve 12, and therefore provides a drive signal 32 which is ever increasing in magnitude and which is used to re-energize the servovalve in a controlled manner, in accordance with equation 5.

If we once again return to the operation of the logic device 16 which is associated with the drive system of channel 2, it is observed that at the same time that $E_0(t)$ provides an ever increasing drive signal 32 which is employed to re-energize the servovalve 12, the logic device 16 monitors the drive signal 32 and continuously re-evaluates the quantity $|E_c(s)-kI_c(s)|$. When, in fact, the internal error magnitude becomes less than the preselected internal error magnitude, the comparator device 24 outputs to the programmable switch 14 a logic value of I=1. It is observed that with this final step, the switching scheme of the present invention is completed, since the programmable switch 14 is now programmed to switch to channel 4 (i.e. $\overline{E}=1, I=1$).

The safety apparatus of the present invention, in summary, represents an advance over the prior art because it enables a servovalve to be employed safely in a state-of-the-art application. The safety apparatus of the present invention quickly and safely de-energizes a normal mode of operation of a servovalve upon the ocurrence of an external error. Moreover, upon the removal of the external error, the safety apparatus of the present invention quickly and safely re-energizes the servovalve back to its normal mode of operation.

Although specific embodiments of the present invention have been described herein, it will be obvious to those skilled in the art that various modifications may be made without departing from the spirit of the invention. With the foregoing in mind, it is understood that the invention is intended to be limited solely by the appended claims.

I claim:

1. Safety apparatus for an electrohydraulic servovalve, comprising:
   (a) programmable switch means programmed for switching sequentially amongst a plurality of channel means based on whether or not the electrohydraulic servovalve is subjected to an external error and whether or not the electrohydraulic servovalve is free from internal error;
   (b) a plurality of channel means, each of which receives an input control signal and develops a drive signal to drive said electrohydraulic servovalve;
   (c) means to determine whether or not the electrohyraulic servovalve is free from internal error, for input to said programmable switch means, by comparing an output signal of said electrohydraulic servovalve with said input control signal;
   wherein said plurality of channel means is realized by four drive systems comprising:
   (a) a first drive system defined by a transfer function G(s) that is employed when the electrohydraulic servovalve is in a normal mode of operation and there is no external or internal error;
   (b) a second and third drive system defined by a transfer function $$\frac{\omega_n^2}{s^2 + 2\zeta\omega_n s + \omega_n^2}$$

where
   $s=j\omega$ is a Laplacian operation
   $\omega n$ is the undamped natural frequency and
   $\zeta$ is the damping ratio of the second and third drive system,
   further including an input of said second and third drive system connected to ground, which second and third drive systems function together to safely de-energize the electrohydraulic servovalve upon the occurrence of external error; and
   (c) a fourth drive system defined by a transfer function $-k_1/s$, where $k_1$ is a constant of integration, which fourth drive system, through the operation of said transfer function $-k_1/s$, controllable re-energizes the electrohydraulic servovalve back to its normal mode of operation upon the removal of external error.

2. The apparatus of claim 1, wherein said means to determine whether or not the electrohydraulic servovalve is free from internal error further includes a logic means comprising:
   (a) adder means that accepts as a first input, said input control signal, and as a second input, said output signal of said electrohydraulic servovalve, and forms a sum of the absolute magnitude of said first and second inputs; and
   (b) comparator means for comparing said sum against a preselected internal error magnitude, and outputting different digital logic values based on whether said sum is greater or less than said preselected internal error magnitude.

* * * * *